(No Model.)
M. S. DICKINSON.
DRIVING REINS.
No. 392,789. Patented Nov. 13, 1888.
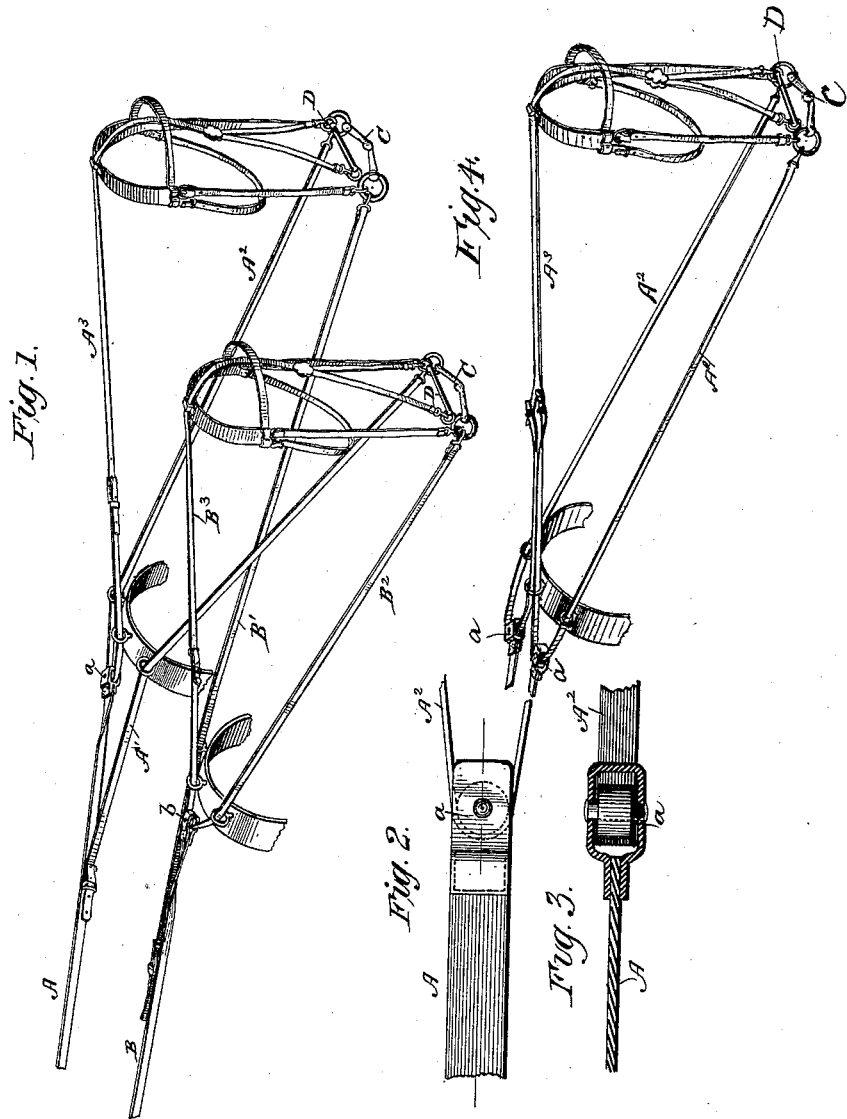
WITNESSES:
Fred G. Dieterich.
Edw. W. Byrn.
INVENTOR.
M. S. Dickinson
BY Munn & Co.
ATTORNEY.

UNITED STATES PATENT OFFICE.

MATTHEW S. DICKINSON, OF RIDGELY, MARYLAND.

DRIVING-REINS.

SPECIFICATION forming part of Letters Patent No. 392,789, dated November 13, 1888.

Application filed July 11, 1888. Serial No. 279,683. (No model.)

*To all whom it may concern:*

Be it known that I, MATTHEW SMITH DICKINSON, of Ridgely, Caroline county, State of Maryland, have invented a new and useful Improvement in Driving-Reins, of which the following is a full, clear, and exact description.

The object of my invention is to provide an improvement in driving-reins which will dispense with the ordinary checkrein, and which, while causing the horse to carry a high head, will also allow perfect freedom to the animal to stretch out his neck and lower his head when tension on the reins is slackened, and will also allow the animal to work his head or change the angle of the same even when the reins are under tension.

Figure 1 is a perspective view of a set of double driving-reins made in accordance with my invention and connected to the bridle. Figs. 2 and 3 are details of one of the connections of the driving-reins. Fig. 4 represents the application of my invention to a single harness.

A B represent the two main driving-reins of an ordinary double harness. One of these driving-reins, A, transmits its pull to the left-hand side of each bit, and the other, B, transmits its pull to the right-hand side of each bit, the usual cross-reins, A' B', being connected with the main reins A and B for this purpose. The reins A and B do not, however, extend all the way to the bridle-bit, but terminate back of the saddle, and are provided each with a pulley, $a$. (See Figs. 2 and 3.) Around this pulley extends a rein-section, $A^2$, on one side, and $B^2$ on the other, which connect, respectively, with the bits, and after passing around the pulley $a$ are fastened to an overdraw-strap, $A^3$ and $B^3$, respectively, which overdraw-straps have branched ends below, that connect with a separate overdraw-bit, D. It will thus be seen that the overdraw-strap $A^3$ and rein-section $A^2$ are practically continuous and freely pass around the pulley through which the draft-strain is applied. When the main reins A B are therefore tightened, the strain is equally divided and transmitted equally to its main bit C and to the overdraw-bit D through strap $A^3$. This causes the horse to carry a high head and permits a perfect control of the driver over his team. At the same time, when tension on the reins is slackened, the horse may stretch out his neck and lower his head, thus securing a more restful and comfortable position, and permitting him to drink water. As the strap $A^3$ and rein-section $A^2$ freely pass through the pulley, it will be seen that the horse may move his head by changing its angle, one section, $A^2$, being shortened as the other, $A^3$, is lengthened, and vice versa, independently of their connection with the main driving-rein.

As a modification of my invention, a loop or ring may take the place of pulley $a$.

As the checkrein is dispensed with, so, also, is the water-hook. I prefer, however, (to keep the reins from flapping about,) to use three terrets on each saddle, through which the three sections of reins for each horse pass.

My invention may be used for either single or double harness.

In defining my invention with greater clearness, I would state that I am aware that it is not new to use a pulley for connecting the main rein to the cross-rein of a double harness, as shown in Patent No. 339,405, and I therefore do not claim, broadly, the principle of a rein passing around a pulley.

I am also aware of Patent No. 59,937; but this neither involves the principle of the overdraw-bit nor the division of the strain of the main rein around a pulley to the two bits.

I am also aware of the Patent No. 201,801, in which the main rein passes over a pulley attached to the overdraw near the horse's head, and am also further aware of Patent No. 324,765, in which the overdraw is connected by a buckle to each rein of a pair of double driving-reins. My invention is distinctive in the fact that the overdraw-rein is continuous with one of the guide-reins leading to one side of the main bit, and the main rein has a pulley or roller connection in the loop or bend of this overdraw in rear of the saddle.

Having thus fully described my invention, I claim as new and desire to secure by Letters Patent—

1. The combination, with the main reins, main bit, and overdraw-bit, of the overdraw-strap $A^3$ and the short side rein-sections, $A^2$, connected to the cheek-rings and made continuous with the overdraw-strap, and passing freely through guides at the front ends of the main reins at a point in rear of the saddle, substantially as shown and described.

2. The combination, with the main reins, the main bits, and the cross-reins of a double harness, of the two overdraw-bits and the two overdraw-straps, and the short side rein-sections, $A^2 B^2$, made continuous with the overdraw-straps and passing through guides at the front ends of the main reins in rear of the saddle, substantially as shown and described.

MATTHEW S. DICKINSON.

Witnesses:
GEO. S. BROCK,
CHAS. A. PETTIT.